United States Patent [19]

Johna et al.

[11] Patent Number: 5,112,624
[45] Date of Patent: May 12, 1992

[54] PREVENTION OF DIGESTIVE DISTURBANCES IN HERBIVORES

[75] Inventors: Josef Johna, Mutterstadt; Lothar Rasthofer, Munich; Hermann Daum, Birkenau, all of Fed. Rep. of Germany

[73] Assignee: Knoll AG, Ludwigshafen, Fed. Rep. of Germany

[21] Appl. No.: 540,122

[22] Filed: Jun. 19, 1990

[30] Foreign Application Priority Data

Jun. 23, 1989 [DE] Fed. Rep. of Germany ....... 3920561

[51] Int. Cl.$^5$ .............................................. A23K 1/00
[52] U.S. Cl. ...................................... 426/2; 426/52; 426/53; 426/807
[58] Field of Search .............. 426/2, 52, 53, 807; 424/94.2, 94.21

[56] References Cited

U.S. PATENT DOCUMENTS

| | | | |
|---|---|---|---|
| 2,878,123 | 3/1959 | Beuk et al. | 424/94.21 |
| 3,803,304 | 4/1974 | Antonides | 424/94 |
| 3,956,483 | 5/1976 | Lewis | 424/94.21 |
| 3,984,575 | 10/1976 | Farr | 426/2 |
| 4,079,125 | 3/1978 | Sipos | 424/032 |
| 4,447,412 | 5/1984 | Bilton | 424/94.21 |
| 4,689,226 | 8/1987 | Nurmi et al. | 426/2 |

FOREIGN PATENT DOCUMENTS

| | | |
|---|---|---|
| 2602260 | 8/1977 | Fed. Rep. of Germany . |
| 6055098 | 3/1982 | Japan . |
| 0829115 | 5/1981 | U.S.S.R. ............ 424/94.21 |
| 826033 | 12/1959 | United Kingdom . |

OTHER PUBLICATIONS

The Merck Index Eighth Edition Merck and Co. Publishers 1986 p. 780.

*Primary Examiner*—R. B. Penland
*Attorney, Agent, or Firm*—Oblon, Spivak, McClelland, Maier & Neustadt

[57] ABSTRACT

A method for preventing digestive disturbances in herbivores entails supplementing their feed with adequate amounts of pancreatin which has preferably been given a neutral taste.

10 Claims, No Drawings

PREVENTION OF DIGESTIVE DISTURBANCES IN HERBIVORES

The present invention relates to the feeding of animal pancreatin, which has preferably been given a neutral taste and/or flavored, to herbivores to prevent digestive disturbances, but also for general promotion of digestion.

Digestive disturbances in dogs are occasionally treated with enteric pancreatin tablets from human medicine, usually unsuccessfully because the tablets must pass through the stomach unchewed.

The use of bacteria which produce lactic acid for the treatment of digestive disturbances in herbivores has also been disclosed. These initially exacerbate the diarrhea and only slowly restore the natural gut flora. Thus, there is an initial additional weakening of the animals.

Apart from the fact that digestive disturbances occur repeatedly in herbivores, despite all precautions, even in animals there is a psychological effect on digestion. The excitement before races or competitions is communicated to racehorses and racing camels which are known to be very sensitive. This may have an adverse effect on digestion. The animals, which are trained for high performance, are not in optimal condition precisely when it is important. Besides psychological effects, the diet is of far greater importance. A change in the feed, wet grass, oils and fats added to the feed and deficiencies of digestive enzymes may upset the digestive system. Deficiencies of digestive enzymes in young animals recently separated from the dam, e.g. foals, calves and lambs, initially results in digestive disturbances, often with a considerable loss of weight. The most serious factor is that the attempts of owners of competitive and breeding horses to maximize the performance of the animals usually lead to the animals being given more than sufficient protein and fats. The consequences are often digestive disturbances (bloating, diarrhea, colic) associated with loss of weight and weakening, i.e. precisely that which it was wished to avoid. The disturbance of gut flora allows excessive growth of non-physiological bacteria and leads to the production of toxins which damage the liver, have adverse effects on the blood picture and may even result in the development of edema. The conventional drug treatments merely eliminate some symptoms, but do not change the overall picture. Hence there was a pressing need for a method of eliminating the digestive disturbances with all their sequelae, or of preventing these altogether.

It is an object of the present invention to develop a method for preventing and eliminating digestive disturbances in herbivores, especially horses, camels, cattle and sheep, in particular without the abovementioned disadvantages of the bacteria which produce lactic acid.

We have found that this object is achieved by feeding pancreatin in an effective amount to herbivores, especially to horses, camels, cattle and sheep, and in particular horses and camels, which are employed in sport or breeding, and in young animals in the first few weeks after separation from the dam.

Trials have shown that adequate supplementation of the usual feed with pancreatin results in permanent improvement and elimination of the abovementioned disturbances. Surprisingly, porcine pancreatin, whose composition (enzyme pattern) differs fundamentally from that of pure herbivores, has proven especially useful for this.

The daily dose can be in the range from 5 to 200, preferably 5 to 20, mg/kg of body weight, depending on the severity of the digestive disturbance. The preventive dose, i.e. as a general feed supplement, will tend to be in the lower part of this range. The pancreatin is mixed with the feed manually or mechanically. As a rule, it is employed not in pure form but as a 0.1 to 50 % strength formulation (premix) mixed with extenders (inert substances) such as ground calcite, which is also useful as a mineral supplement, or dry feeds such as corn meal, soybean meal, bran or ground grain. This facilitates the dosage and mixing with the feed. No other supplements acting on the digestive tract are necessary.

Because of the particular conditions in the digestive tract, especially in the forestomach, of herbivores, there is no need to protect the pancreatin from gastric acid as is necessary in humans and carnivores. Porcine pancreatin has proven just as useful for acute digestive disturbances in racehorses, foals and calves as for preventive use as a general feed supplement, or else for only a few days before horse races. Findings on horses and cattle can be extrapolated to camels and sheep.

It is expedient, in order to improve the acceptance of the feed, to mask the taste of pancreatin, before or after preparation of the feed, by neutralizing the taste and/or by flavoring. This is carried out by methods known for other products, by substances being mixed with or applied to the pancreatin particles or the pancreatin-containing prepared feed. These substances must not have an unpleasant taste, must not impair the activity of the pancreatin, and must be physiologically acceptable. Application must take place under mild conditions, i.e. avoiding high temperatures (max. about 50° C.), moisture and high shear forces. Examples of suitable substances are lecithin, cellulose, and mono-, di- and triglycerides. Examples of suitable flavorings are those of peppermint, artichokes, green apples, coconut and vanilla. The application can take place by, for example, spraying on a solution (e.g. alcoholic) or melt in a fluidized bed or tablet-coating drum.

The pancreatin is obtained by freeze-drying and defatting animal pancreatic glands, preferably from pigs. The stated concentrations for the premix are based on the pancreatin obtained in this way, irrespective of its particular enzyme content. Porcine pancreatin obtained as described in EP-B-115,023 has proven particularly useful.

EXAMPLE 1

4-year old trotting mare

Preliminary report: refractory diarrhea, previous veterinary treatment with sulfonamides and spasmolytics. Occasional refusal of feed from the manger, feeding behavior overall very fastidious, excessive intake of straw, poor training performance, tiring very rapidly, excessive sweating. After administration of 20 g of pancreatin per day, which had to be administered forcibly in the first few days (by balling gun), there was a distinct improvement in feeding behavior even by the second day of intake, and the concentrate ration provided was completely consumed. The signs of diarrhea disappeared 9 days after the start of administration. Administration lasted 4 weeks in total, and no relapse occurred (up to 6 months after the end of treatment).

EXAMPLE 2

8-year old Trakhener mare

Chronic recurring constipation colic at intervals of 1-2 weeks. Colic ceased after administration of 8 g of pancreatin per day. The horse remained free of colic in the four months, observation period.

EXAMPLE 3

4-year old half-bred

The horse was stabled in September and diarrhea started in October. Besides soft and foul-smelling feces, there was found to be a serious loss of weight and a great decrease in performance. The disorder lasted a total of 4 months, and all treatments were unsuccessful. The feed comprised 5 kg of hay and 5 kg of oats, distributed over 3 meals. 3 days after starting one week of supplementation with 6 g of pancreatin per day the diarrhea had stopped. The horse gained weight and was given 4 g of pancreatin a day for a further month and remained clinically normal.

EXAMPLE 4

Riding school horse

The horse had suffered for 6 months from diarrhea of varying severity, and the mode of feeding had been changed several times without any success. The diarrhea disappeared within 2 days after administration of 10 g of pancreatin per day. Administration of pancreatin was continued for 14 days.

EXAMPLE 5

2-year old Haflinger mare

Frequent constipation colic; after other causes had been ruled out (feeding, teeth, etc.), digestion was promoted with 10 g of pancreatin a day divided proportionally over the meals. Colic no longer occurred in the 4-month observation period.

EXAMPLE 6

9-year old Haflinger mare

Two episodes of spasmodic colic in quick succession; after administration of 10 g of pancreatin a day there was no attack of colic in the six-week observation period.

EXAMPLE 7

8-year old trotting gelding

The horse was used for general riding because of its poor nerves, diminished will to perform or even intractability; feces chronically ill-formed, bloating, wasting. Changing the feed produced no result. After 10 g of pancreatin each day: after 14 days distinct improvement in appearance, weight gain, feces well-formed, gradual decrease in bloating, improved will to perform.

EXAMPLE 8

8-year old trotting stallion

Feces ill-formed, chronic digestive disturbances with foul-smelling, ill-formed feces and cecal tympany, poor nerves. After 10 g of pancreatin per day: improved overall impression: more lively, feces better formed and odor somewhat improved, decrease in flatulence and tympany, increased performance and self-confidence; surprisingly took second place in first race.

EXAMPLE 9

Hot-blood gelding, about 20 years old

Chronic diarrhea in a three-week cycle. 10 g pancreatin a day immediately resulted in relatively pale, well-formed feces.

EXAMPLE 10

4-year old trotting stallion

Poor race performance, great loss of tissue, increase in serum gamma-GT and bilirubin; no improvement despite period without racing; 10 g of pancreatin a day rapidly produced weight gain, return of liver tests to the normal range and improved working performance.

EXAMPLE 11

4-year old trotting mare

Mediocre racing performance, little fighting spirit at the finish; the mare appeared irritable and produced small hard feces; chronic refractory increase in liver test results (gamma-GT, bilirubin). Liver-protective infusions, lactose enzymes and homeopathic remedies proved ineffective. 10 g of pancreatin a day: Improvement in appearance, feces normal, after about 3 weeks, despite training and races (now with improved performance) return of bilirubin to the normal range, gradual fall in serum gamma-GT.

We claim:

1. A method for preventing digestive disturbances in horses which are employed in sport or breeding for sport, consisting essentially of the step of:
   feeding said horse feed with 5-200 mg of pancreatin per kg of body weight per day.

2. The method of claim 1, wherein said pancreatin is porcine pancreatin.

3. The method of claim 1, wherein said feeding step consists of feeding said horse said feed and said pancreatin.

4. The method of claim 1, further consisting of neutralizing the pancreatin taste of said pancreatin containing feed or flavoring said pancreatin containing feed.

5. The method of claim 1, further consisting essentially of masking the taste of said pancreatin by neutralizing the pancreatin taste or flavoring said pancreatin.

6. In a method of feeding horses which are employed in sport or breeding for sport, the improvement consisting essentially of:
   supplementing the feed with a digestive disturbance preventing amount of pancreatin of 5-200 mg per kg of body weight per day.

7. The method of claim 6, wherein said pancreatin is porcine pancreatin.

8. The method of claim 6, wherein said feeding step consists of feeding said horse said feed and said pancreatin.

9. The method of claim 8, further consisting of neutralizing the pancreatin taste of said pancreatin containing feed or flavoring said feed.

10. The method of claim 6, further consisting essentially of masking the taste of said pancreatin by neutralizing the pancreatin taste or flavoring said pancreatin.

* * * * *